G. FAST.
GEARING.
APPLICATION FILED MAY 18, 1915.
1,217,427.
Patented Feb. 27, 1917.
2 SHEETS—SHEET 2.
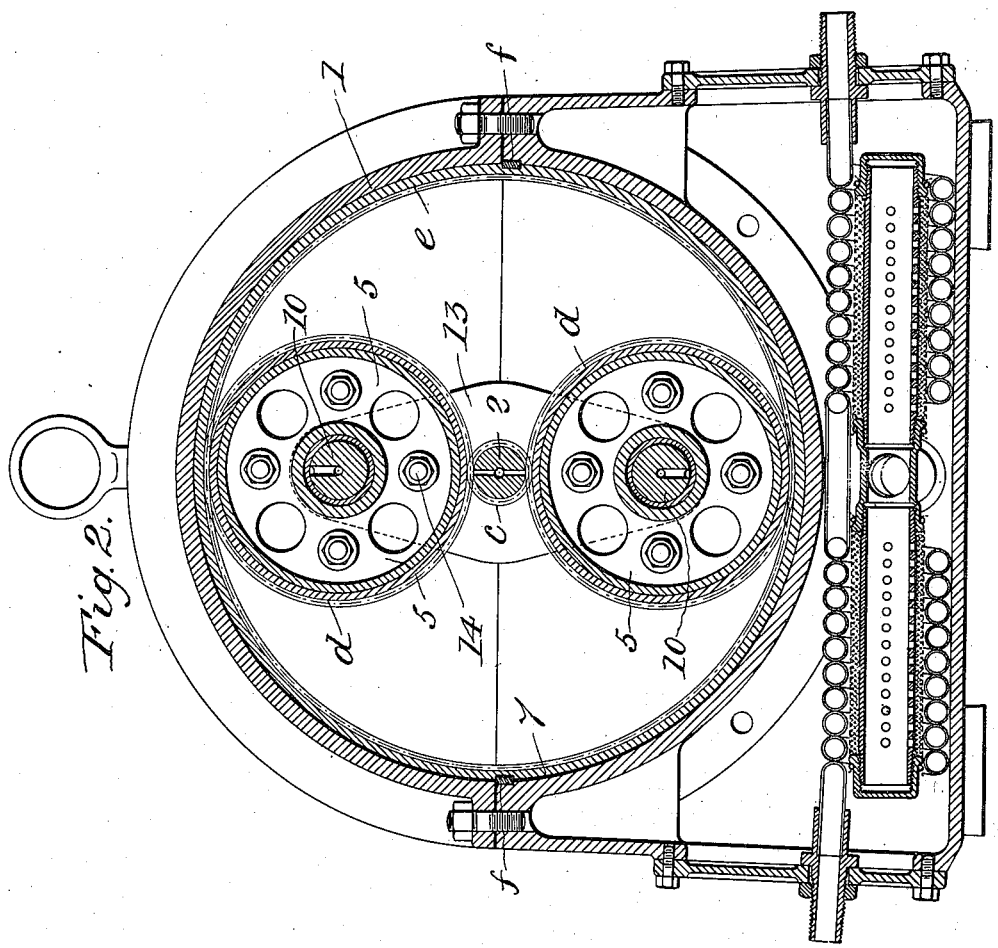
WITNESSES:
Sarah C. Schotta.
Julia B. Robinson.
INVENTOR.
Gustave Fast
BY
G.H.W.T. Howard.
ATTORNEYS.

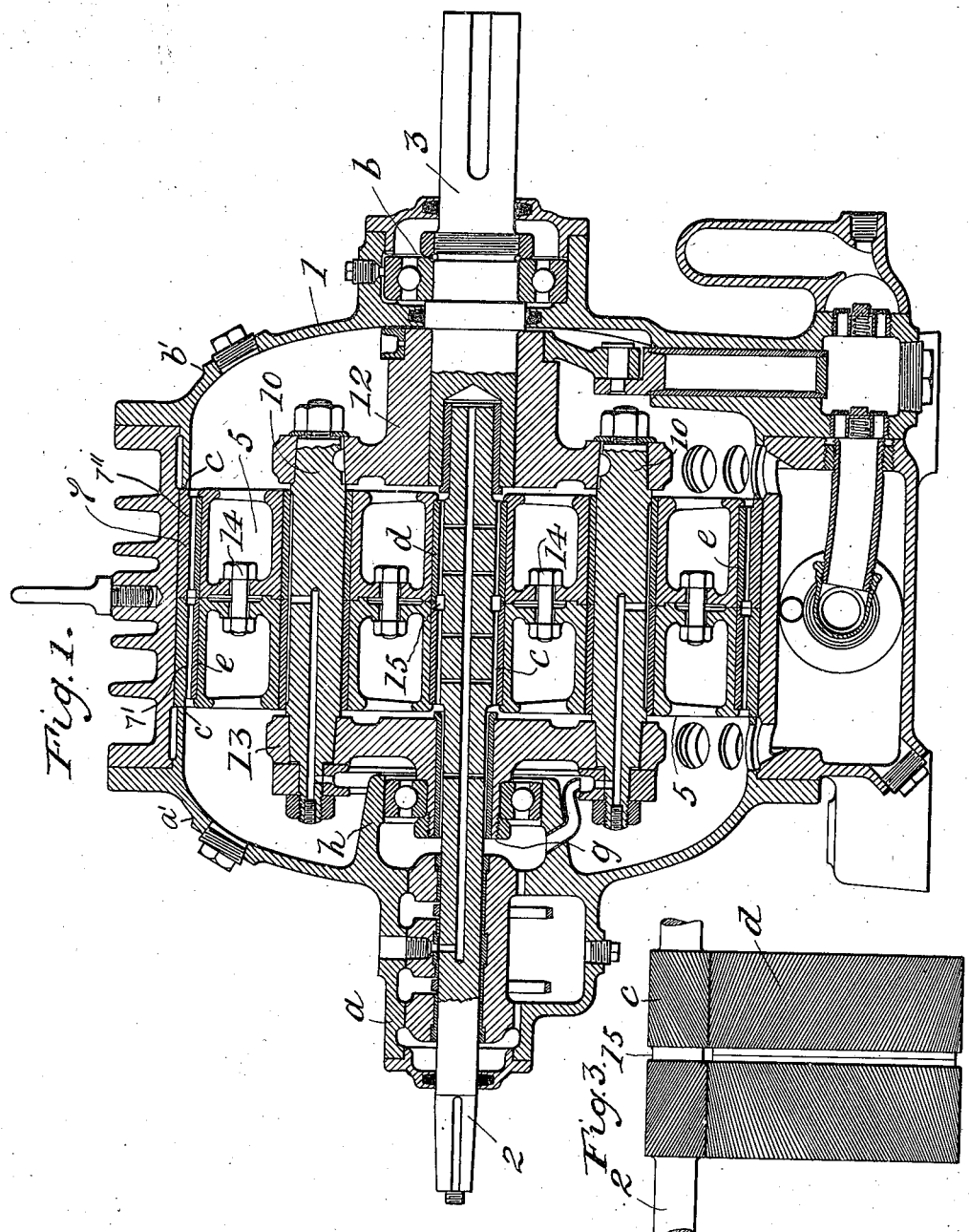

UNITED STATES PATENT OFFICE.

GUSTAVE FAST, OF BALTIMORE, MARYLAND.

GEARING.

1,217,427.  Specification of Letters Patent.  Patented Feb. 27, 1917.

Application filed May 18, 1915. Serial No. 28,822.

*To all whom it may concern:*

Be it known that I, GUSTAVE FAST, a subject of the King of Sweden, residing at Baltimore, Maryland, have invented certain Improvements in Gearing, of which the following is a specification.

This invention relates to certain improvements in that class of gearing in which the rotation of one shaft is transmitted to another at a reduced speed, or vice versa, as will hereinafter fully appear.

In the further description of the said invention which follows, reference is made to the accompanying drawings, forming a part hereof and in which:—

Figure 1 is a central side sectional view of the improved apparatus, and Fig. 2 a section taken across the axes of the gearing.

Fig. 3 is an exterior side view of certain parts of the apparatus.

Referring now to the drawings, 1 is the casing or shell of the apparatus which can be of any approved construction, and 2 the high speed shaft the outer end of which is supported by a suitable bearing $a$ formed as a part of the casing, and at its inner end by the low speed shaft 3 into which it extends. The low speed shaft 3 at its outer end is sustained by the bearing $b$ which is a part of the casing, and at its inner end in a manner and by means of appliances hereinafter described.

The high speed shaft 2 is provided with helical teeth $c$ which mesh with similar teeth $d$ on the planetary wheels 5 which in turn are in gear with the teeth $e$ on the inner surface of the fixed annulus 7. Rotation of the annulus 7 within the casing 1 is prevented by the keys $f$ shown only in Fig. 2.

The planetary wheels 5 which revolve about the high speed shaft 2, and rotate on their axes, are loose on spindles 10 which are fastened to and project laterally from the head 12 which is tightly secured to, or formed as a part of the slow speed shaft 3. The outer ends of these spindles are coupled by the secondary head 13 the hub $g$ of which rotates in the bearing $h$ which is in effect a part of the casing.

From the foregoing it will be seen that the heads 12 and 13 form practically, a part of the low speed shaft 3 and serve not only to carry the spindles 10 and the planetary gears thereon, but also to sustain the inner end of the said shaft without affecting in any manner the high speed shaft, there being a considerable annular space between the said shaft and the hub $g$ of the secondary head. The inner end of the high speed shaft extends into and is supported by the low speed shaft, as is well shown in Fig. 1 of the drawings.

It will be understood that the helical teeth throughout the entire system of gearing employed, are formed in right and left hand sections, and that should the two sections of the planetary wheels be separate and entirely independent of each other they would be perfectly balanced in a lateral direction, but a couple would be exerted in respect to each gear individually by the lateral component of the action of the high speed gear and the lateral component of the reaction of the annulus, tending to tilt the said gears individually in a transverse direction to their motion, thereby causing uneven bearing-pressures on their spindles; I therefore connect the two sections of the planetary gears by the bolts 14 which take the strain and thereby prevent the tilting action referred to.

In the high speed shaft, I prefer to separate the right from the left hand teeth by a groove 15 as shown in Fig. 1 of the drawings.

As great exactitude is necessary in bringing the teeth of the sections or parts of the planetary gears together, so as to make the two sets of teeth throughout their length accurately mesh with those on the high speed shaft, I allow the teeth of both sections of the wheels to independently mesh with the teeth on the high speed shaft, and then fasten the sections together by means of the bolts 14. To admit of the automatic adjustment referred to, the holes for the said bolts are slightly elongated.

It will be observed that the internal gear or annulus 7 is made in two parts 7', 7" and the casing is made with two heads $a'$ and $b'$, which abut against the said separate parts at $c$. This divided formation of the annulus having the internal helical gear thereon enables proper assembling of the parts. For instance, the planetary gears can be placed on their spindles and the secondary head or disk 13 can then be placed in position and secured and thereafter the two parts 7', 7" of the internal helical gear can be placed in position, one being thrust axially in one direction and turned or screwed into mesh with the companion portions of the planetary gears and the other member can be thrust axially in the opposite direction and turned or screwed into its companion portions of the planetary gears. These two parts or sections of the internal helical gear abut against each other and may be held in any suitable way to the surrounding casing, for instance, by the keys *f* before mentioned and laterally they may be sustained, that is against axial movement by the heads *c* abutting thereagainst. In the form of the invention shown however, the planetary gears also are formed in two parts bolted together at 14 and in assembling, the annulus or internal gear may be placed in position first and thereafter the planetary gear members may be engaged thereby by moving them axially and from opposite sides of the internal helical gears turning them meanwhile and then these parts of the planetary gears may be bolted together, after which the head 13 will be put in place and secured and finally the heads of the main casing will be placed in position and secured.

In either case the parts are assembled by locating one member in position and then introducing the parts of the other member into connection therewith by an axial and turning movement. Where in the appended claims I refer to the gearing as composed of right and left hand sections this refers to the disposition of the teeth and not to any divided form of the parts.

I claim as my invention:—

1. In apparatus for the purpose described a fixed casing, shafts in alinement, and gearing for driving one shaft from the other consisting of a central gear on one shaft, planetary gears supported from the other shaft, and meshing with the first mentioned gear and a stationary internal gear on the fixed casing with which the planetary gears engage, said planetary gears and the central gear, together with the internal gear all having helical teeth in right and left hand sections, said stationary internal gear with its right and left-hand teeth serving to hold the planetary gears and central gear against endwise movement while causing the rolling of said planetary gears, substantially as described.

2. In apparatus for the purpose described, a casing, an annulus within and supported on the casing having internal helical teeth, two shafts in alinement, a central gear on one shaft having helical teeth, planetary helical gears carried by the other shaft and meshing with the internal gear teeth of the annulus and with the central gear, the helical teeth on the several gears being disposed in right and left hand relation and one member of the helical gearing being formed in parts divided from each other between the right and left hand helical teeth to permit assembly with the other members by an axial and circumferential movement in respect thereto, and means for holding the divided parts in place, substantially as described.

3. In combination a casing, an internal gear having right and left hand helical teeth, said gear being supported on the casing, shafts within the casing in alinement, one of said shafts having planetary gears carried thereby, each having helical teeth in right and left hand relation and a gear on the other shaft having helical teeth to mesh with those of the planetary gears, said internal gear being formed in two parts divided from each other at a point between the right and left hand helical teeth to permit assembly with the planetary gears by an axial and circumferential movement in respect thereto, and means for holding the parts of the internal gear in place, substantially as described.

4. In combination a casing, an internal gear therein having right and left hand helical teeth, shafts within the casing in alinement, one of said shafts having planetary gears carried thereby, each having helical teeth in right and left hand relation and a gear on the other shaft having helical teeth to mesh with those of the planetary gears, said internal gear being formed in two parts divided from each other at a point between the right and left hand helical teeth, said casing having a removable head serving to hold the two parts in place.

5. In combination a casing, an annulus having right and left internal helical teeth, shafts in alinement, planetary gears having right and left hand helical teeth meshing with the internal gear, a central gear having right and left hand helical teeth meshing with the planetary gears, a head on one of the shafts, spindles supported at one end in said head and on which the planetary gears are mounted, a second head supporting the other ends of said spindles, and removably connected thereto, a removable bearing on the casing for the said head, and through which bearing and head the other shaft extends, one of the gear members, annulus or planetary, being formed in parts, of which one part carries the right hand helical teeth and the other part carries the left hand helical teeth, substantially as described.

6. In apparatus for the purpose described, a casing, a fixed annulus within the casing having internal helical teeth, a high and a low speed shaft in axial alinement, the former provided with helical teeth in right and left hand sections, and supported at its outer end by a bearing in the casing, and having a bearing at its inner end, a head fixed to the low speed shaft, a second head surrounding the high speed shaft but journaled in the casing independently of said high speed shaft, spindles carried by the said heads, and planetary gears loose on the spindles and meshing with the teeth on the high speed shaft and on the annulus, substantially as described.

7. In apparatus for the purpose described, a casing, a fixed annulus within the casing having internal helical teeth, a high and a low speed shaft in axial alinement, the former provided with helical teeth in right and left hand sections, and supported at its outer end by a bearing in the casing, and having a bearing at its inner end, a head fixed on the low speed shaft, a second head surrounding the high speed shaft but journaled in the casing independently of said high speed shaft, spindles carried by the said heads, and planetary gears loose on the spindles and meshing with the teeth on the high speed shaft and on the annulus, each of the said planetary gears being formed in two sections with adjusting connecting means between said sections, permitting one section to be adjusted circumferentially in relation to the other, substantially as described.

8. In combination a casing, an internal gear therein, shafts within the casing in alinement, one of said shafts having planetary gears carried thereby and meshing with the internal gear, a central gear meshing with the planetary gears, a head on one of the shafts, spindles supported at one end in said head and on which the planetary gears are mounted, a second head supporting the other ends of said spindles, and removably connected thereto, and a removable bearing on the casing for the said head, and through which bearing and head the other shaft extends.

9. In an apparatus for the purpose described, a casing, a fixed annulus within the casing having internal helical teeth, a high and a low speed shaft in axial alinement, the former provided with helical teeth in right and left hand sections, and supported at its outer end by a bearing which constitutes a part of the casing, and at its inner end by the low speed shaft into which it projects, combined with a head which is tight on the low speed shaft, a second head which is journaled in the casing, spindles carried by the said heads, and planetary gear wheels which are loose on the spindles and in mesh with the teeth on the high speed shaft and the teeth on the annulus.

GUSTAVE FAST.

Witnesses:
WM. T. HOWARD,
SARAH C. SCHOTTA.